Patented Dec. 18, 1951

2,578,720

UNITED STATES PATENT OFFICE 2,578,720

FLUORINATION OF FUSED-RING ORGANIC COMPOUNDS WITH COBALT TRIFLUORIDE

Earl T. McBee, La Fayette, Ind., and Richard M. Robb, Wilmington, Del., assignors to Purdue Research Foundation, La Fayette, Ind., a corporation of Indiana No Drawing. Application December 22, 1945, Serial No. 637,072

6 Claims. (Cl. 260—648)

This invention relates to organic compounds containing fluorine, particularly to fluorine-containing fused-ring organic compounds, and to a method for the preparation thereof. This application is a continuation in part of applications Serial Nos. 595,888 and 595,889, filed May 25, 1945, and Serial No. 603,272, filed July 4, 1945, now abandoned.

The preparation of fluorine-containing fused-ring organic compounds has, except in a few instances, not been accomplished heretofore. These compounds, due to their relatively high molecular weight, to their non-flammability, to their chemical stability, and to their wide liquid range, are of great value. Attempts to prepare these compounds using heretofore known general methods of fluorination, such as direct fluorination with elemental fluorine, the replacement of chlorine, bromine or iodine with fluorine using hydrogen fluoride or a metal fluoride, or the addition of hydrogen fluoride to carbon-carbon multiple bonds, have not led to satisfactory results.

The need for a convenient procedure for the preparation of fluorine-containing fused-ring organic compounds is evident. It is an object of the present invention to provide a method for the preparation of fluorine-containing fused-ring organic compounds. An additional object is to provide an improved procedure for the preparation of fluorine-containing fused-ring organic compounds whereby the use of a chlorinated, brominated, or iodinated intermediate compound is not essential. Still a further object is to provide a method whereby fluorine-containing fused-ring organic compounds, including perhalo organic compounds, may be prepared from partially or completely chlorinated, brominated or iodinated fused-ring organic compounds. An additional object is to provide a method whereby fluorine-containing fused-ring organic compounds may be prepared from partially or completely halogenated fused-ring organic compounds containing two or more different halogens. An additional object is to provide a method for increasing the fluorine content of a partially fluorinated fused-ring organic compound. An additional object is to provide a method for preparing fluorine-containing fused-ring organic compounds whereby the formation of undesirable decomposition or polymerization products is substantially avoided. An additional object is to provide a method for fluorinating fused-ring organic compounds whereby a predetermined degree of fluorination, including perfluorination, may be effected readily. An additional object is to provide a fluorination method which is not subject to certain of the disadvantages set forth above. Still a further object is to provide a novel fluorinating agent capable of converting unsaturated fused-ring organic compounds into saturated fluorine-containing fused-ring organic compounds and of replacing hydrogen and established halogen other than fluorine in fused-ring organic compounds with fluorine. Still an additional object is to provide certain new and novel fluorine-containing fused-ring organic compounds, including fluorocarbons and other highly fluorinated products. Other objects will become apparent from the following specification and claims.

According to the present invention the foregoing and related objects are accomplished readily and economically by contacting a fused-ring organic compound with cobalt trifluoride under suitable reaction conditions until a desired degree of fluorination is effected. Cobalt trifluoride has been found to be an excellent fluorinating agent for fused-ring organic compounds and, when the fluorination reaction is carried out under conditions hereinafter described, the reaction can be controlled without difficulty. Substantially any desired proportion of the maximum theoretical amount of fluorine can be introduced into a fused-ring organic molecule with the formation of little or no decomposition or polymerization products. Aromatic, heterocyclic and alicyclic fused-ring organic compounds can be converted readily to fluorine-containing compounds. Hydrogen in fused-ring organic molecules can be replaced with fluorine as may also chlorine, bromine and iodine which may be present in the organic reactant. Unsaturated carbon-carbon bonds can be saturated by the addition of fluorine thereto. Aromatic and other unsaturated fused-ring organic compounds, such as anthracene, naphthalene, phenanthrene, quinoline, and their substitution derivatives, can be fluorinated readily, usually first with the addition of fluorine atoms at points of unsaturation and then, if desired, with the replacement of hydrogen and of halogen other than fluorine in the molecule and the production of fluorine-containing compounds.

Fused-ring organic compounds containing both hydrogen and halogen can be fluorinated with cobalt trifluoride and either a part or all of the hydrogen replaced with fluorine to form partially or completely halogenated fluorine-containing compounds.

Fused-ring halohydrocarbons can be fluorinated with the replacement of a part only or of all of the hydrogen in the molecule to form a fluorine-containing fused-ring halohydrocarbon or halocarbon, respectively.

Fused-ring halocarbons containing at least one halogen atom other than fluorine in the molecule can be fluorinated to form halocarbons of increased fluorine content.

Examples of fluorine-containing fused-ring organic compounds which may be made by the process of the invention including perhalo fused-ring organic compounds are monofluorodecahydronaphthalene, difluorodecahydronaphthalene, monochlorodifluorodecahydronaphthalene, tetrachlorotetrafluorodecahydronaphthalene, perfluoronaphthalene, monofluorotetradecahydroanthracene, dichloromonofluorotetradecahydroanthracene, perfluoroanthracane, perfluorophenanthracane, difluorodecahydroquinoline, and many others.

Fused-ring organic compounds containing oxygen, sulfur or nitrogen such as phenathiazine, quinoline, acridine, and their halogen substitution derivatives may be fluorinated, frequently with the replacement of all hydrogen and halogen atoms in the molecule with fluorine, to yield partially or completely fluorinated products.

According to one modification of the present invention, perfluorination may be accomplished and perfluoro compounds may be obtained by contacting a fused-ring organic compound with cobalt trifluoride as an active fluorinating agent under such conditions and for such time that all hydrogen and halogen other than fluorine in the molecule are replaced by fluorine. In most instances, unsaturated carbon-carbon bonds are saturated by the addition of fluorine during such perfluorination. Examples of such perfluoro compounds are perfluoronaphthalane, perfluoroanthracane, perfluorodecahydroquinoline, perfluoroindane, and many others.

Rupture of carbon-carbon bonds may be effected with the formation of fluorine-containing compounds having fewer carbon atoms, in certain instances, in the molecule than does the original fused-ring organic compound fluorinated. This is herein referred to as fluorinolysis. Thus, for example, high molecular weight fused-ring hydrocarbons and fused-ring halohydrocarbons may be converted largely to high molecular weight fluorine-containing fused-ring hydrocarbons, to high molecular weight saturated fused-ring fluorocarbons, i. e., to saturated fused-ring compounds containing only carbon and fluorine, or, under more vigorous reaction conditions to compounds having fewer carbon atoms in the molecule, such as hexafluoroethane and even carbon tetrafluoride, if desired. It has also been observed that in certain instances, substituent groups or radicals other than hydrogen and halogen in a fused-ring compound, e. g., nitro radicals, are replaced with fluorine during the fluorination process, especially when a high degree of fluorination is effected. Such replacement of radicals other than hydrogen and halogen is, however, not an essential feature of the fluorination process of the present invention.

Although the fluorination reaction is exothermic, it proceeds without explosive violence and may be controlled readily so as to produce a product containing substantially any desired proportion of fluorine. The fluorination reaction is carried out at a temperature between about −30° C., or somewhat lower, and about 500° C., or somewhat higher, preferably between about 20° and about 400° C. Generally speaking, the addition of fluorine to a carbon-carbon unsaturated bond using cobalt trifluoride as the active fluorinating agent occurs at a somewhat lower temperature than does the replacement with fluorine of a hydrogen or halogen other than fluorine. This, however, is not always the case. It has also been observed that the optimum temperature for the introduction of a fluorine atom into an organic molecule increases somewhat as the number of fluorine atoms in the organic molecule is increased. It follows that the actual fluorination temperature employed will depend to some extent upon the organic compound fluorinated and the degree of fluorination desired.

During the course of the reaction, the cobalt trifluoride used as a fluorinating agent is converted to cobalt difluoride from which cobalt trifluoride may be regenerated readily by exposing the difluoride to elemental fluorine at an elevated temperature. The reaction may thus be carried out in cyclical manner, the cobalt trifluoride being first contacted with the organic reactant to produce the desired fluorine-containing organic compound and the spent cobalt trifluoride, consisting largely of cobalt difluoride, then regenerated with elemental fluorine and the cycle repeated. Furthermore, it may be desirable in some instances when a highly fluorinated product is desired, to effect only partial fluorination in the first passage of the organic reactant through the fluorination reactor and then to recycle the fluorine-containing product over fresh or regenerated cobalt trifluoride to increase the proportion of fluorine in the organic molecule. Recycling of the fluorine-containing organic product as well as of cobalt fluorides may be continued, if desired, until perfluorination is effected.

Cobalt trifluoride is a solid which is unstable in the presence of water or atmospheric moisture. The compounds are substantially stable, when dry, at temperatures as high as 500° C. and higher. Cobalt trifluoride may be prepared readily in a number of ways, one convenient way being by the treatment of anhydrous cobalt difluoride with elemental fluorine at an elevated temperature, e. g., at temperatures above about 50° C., preferably at a temperature between about 200° C. and about 500° C. Cobalt difluoride may be prepared readily by treating anhydrous cobalt dichloride with anhydrous hydrogen fluoride at temperatures above about 150° C., and in many other ways.

In practising the invention, it has been found convenient to place anhydrous cobalt dichloride in the reaction vessel in which the subsequent fluorination of an organic compound is to be carried out, and then to treat the cobalt dichloride in the vessel first with hydrogen fluoride and then with elemental fluorine under the said requisite conditions of temperature. Following fluorination of a fused-ring organic compound, the spent cobalt trifluoride, which contains a large proportion of cobalt difluoride, may be regenerated and the difluoride reconverted to the trifluoride by passing elemental fluorine over it at an elevated temperature. Thus the consumption of cobalt salts in the process is reduced to a minimum and consists only of such negligible quantities as may be lost mechanically during the process.

Fluorination of a fused-ring organic compound with cobalt trifluoride may be carried out in any convenient manner and in any convenient type of apparatus. It has been found satisfactory to dispose the cobalt trifluoride in a thin layer, e. g., in a layer from about one-half to about one inch thick, on shelves or trays within the reaction vessel or directly on the floor of the vessel itself and to pass a fused-ring organic reactant in vapor form through the vessel. The process is frequently carried out by distributing a shallow layer of cobalt trifluoride throughout the length of a metal tube and passing a fused-ring organic reactant in vapor form through the tube. If desired, tubes with rectangular cross section may be used and the exposed surface of layer of cobalt trifluoride thus increased. The mass may be agitated if desired. The physical form of the cobalt trifluoride is preferably such that easy penetration of the mass of trifluoride by the gases or vapors passing through the reaction vessel is facilitated. Granulated or coarsely powdered cobalt trifluoride has been found to be satisfactory.

The reaction vessel, which may be of iron, nickel or other material resistant to the reactants and reaction products under the conditions of fluorination and regeneration, is maintained at the desired reaction temperature by any convenient means. Heating may be effected in any one of a number of ways, such as by electrical resistance heaters, by gas flames, or by immersing the reaction vessel in a suitable high-boiling liquid such as low-melting alloy. The fluorination reaction is exothermic in nature and in large size reaction vessel heating may not be necessary after the reaction has started. In some instances cooling may even be advisable.

Fluorination of a fused-ring organic compound with cobalt trifluoride may be carried out with the organic reactant in either liquid or gaseous phase. In practice, however, it has usually been found more convenient, especially when a high temperature is required, to pass the organic reactant through the reactor in vapor form. In this way the handling of organic liquids at high temperatures is avoided. The reaction may be carried out at ordinary or reduced pressures. A fused-ring organic reactant may be introduced into the reaction vessel either in the form of its vapor or as a liquid. In the latter instance the organic reactant is usually vaporized in the portion of the reaction vessel nearest the entry port and the vapors are then fluorinated as they pass through the remaining part of the vessel. In certain instances, a fused-ring organic reactant may be heated in a vessel separate from the fluorination vessel, a stream of inert gas, such as nitrogen, hydrogen fluoride, or helium, passed through the heated liquid, and the mixed vapors of inert gas and of fused-ring organic compound then passed into the fluorination vessel. Fluorination with the organic reactant in the vapor phase is conveniently carried out at sub-atmospheric pressure although it may, if desired, be carried out at atmospheric pressure or super-atmospheric pressure.

Although fluorination of a fused-ring organic compound in the vapor phase using cobalt trifluoride as the active fluorinating agent is usually carried out at a temperature between about −30° C., and about 500° C., it may be carried out at any convenient temperature above the condensing temperature of the vapors at the reaction pressure. In certain instances, the temperature of fluorination may even be maintained sufficiently high to cause fluorinolysis. Temperatures sufficiently high to cause the formation of substantial amounts of undesirable by-products are to be avoided.

After the cobalt trifluoride has been largely exhausted and converted substantially to cobalt difluoride, the reaction vessel may be purged with nitrogen or other inert gas to free it from most of the organic substances before elemental fluorine is admitted to the reaction vessel to regenerate cobalt trifluoride. In this way, the possible explosive reaction of residual organic vapor with elemental fluorine within the reaction vessel is avoided. Regeneration of the spent cobalt trifluoride is, as noted above, carried out at a temperature above about 50° C., preferably at a temperature between about 200° C. and about 500° C.

As mentioned previously the process of the invention may, if desired, be carried out with the fused-ring organic reactant in the liquid phase in which case the organic reactant and cobalt trifluoride may be mixed together in any convenient way, e. g., the organic reactant may be stirred in a vessel at the desired temperature and cobalt trifluoride added gradually thereto. Such procedure with the organic reactant in the liquid phase is of particular value when the fused-ring organic compound boils at a high temperature. It has been found that the ratio of the amount of cobalt trifluoride to the amount of fused-ring organic compound necessary when a high degree of fluorination is to be effected is so great that when the reaction is carried out with the organic reactant in liquid phase the final reaction mixture is frequently of a moist granular nature rather than of a fluid nature and is difficult to handle on a large scale. This difficulty may be overcome in a number of ways. Thus the liquid which is to be fluorinated may be diluted with a liquid inert under the reaction conditions, such as a high boiling fluorocarbon, to increase the proportion of liquid in the reaction mixture.

Alternatively fluorination in the liquid phase may be carried out step-wise. Thus in the first step the addition of solid cobalt trifluoride may be stopped while the mixture is still fluid enough to be agitated readily. The reaction product may be filtered or otherwise treated to separate the organic and inorganic portions thereof, and the partially fluorinated organic portion then fluorinated further by adding to it fresh or regenerated cobalt trifluoride. Although the invention is not limited to vapor phase procedures, it is readily apparent that in some instances the fluorination reaction is more conveniently carried out in vapor phase.

The degree of fluorination effected is dependent, among other factors, upon the reaction temperature and the time of contact of the fused-ring organic compound with cobalt trifluoride. In order to effect a high degree of fluorination, e. g., perfluorination, of the organic reactant in the vapor phase during a single phase through the reaction vessel, it may be necessary to pass the reactant vapor very slowly through the vessel thus limiting the rate at which a highly fluorinated product may be produced in any particular reaction vessel. It has also been found that some fused-ring organic compounds are somewhat more thermally unstable in the unfluorinated or only lowly fluorinated state than when they are more highly fluorinated and that, when it is attempted to fluorinate such unfluorinated or lowly fluorinated compounds, to produce a highly fluorinated substance during a single pass of the vapor through the fluorination vessel, it may be necessary to elevate the temperature to such a degree that undesirable decomposition of the fused-ring organic reactant may occur before substantial fluorination is effected.

For these and other reasons it is sometimes convenient and desirable to recycle the fused-ring organic reactant after it has been partially flourinated, usually after the spent cobalt trifluoride has been regenerated to insure there being a high proportion of cobalt trifluoride in the cobalt fluoride mass. This recycling of the organic product may be repeated as many times as is desirable or necessary to introduce the desired proportion of fluorine into the molecule and each recycling is preferably, but not necessarily, carried out at a temperature higher than the preceding one. In this way the first stages of fluorination, which do not require high temperatures and during which relatively unstable organic compounds may be present in the fluorination vessel, are carried out at a relatively low temperature while later stages of fluorination, which usually require a higher temperature and during which only relatively stable fluorine-containing substances are present in the fluorination vessel, are carried out at a higher temperature. The same effect may be obtained by passing the organic reactant through a number of reaction vessels or towers in series each containing cobalt trifluoride and each maintained at a reaction temperature which may, if desired, be higher than that of the preceding vessel. By a suitable arrangement of a number of reaction vessels in series the process may be carried out continuously, it being only necessary to by-pass the vapors of the organic reactant around any one of the reaction vessels while the spent cobalt trifluoride therein is being regenerated with fluorine.

It is to be noted that when the fluorination reaction involves the replacement of hydrogen with fluorine, the replaced hydrogen appears in the reaction product as hydrogen fluoride. When the fluorination involves the replacement of a chlorine, a bromine or an iodine atom with a fluorine atom, replaced halogen appears in the reaction product in elemental form. When, however, the only reaction involved is the addition of fluorine to an unsaturated carbon-carbon bond, hydrogen fluoride or elemental halogen does not appear in the reaction product. The effluent vapors from the reaction may thus, depending upon the substance fluorinated, contain, in addition to the desired fluorine-containing organic compound, hydrogen fluoride and a halogen other than fluorine together with unfluorinated or insufficiently fluorinated organic reactant. In certain other instances, e. g., in the fluorination of an oxygen- or nitrogen-containing compound accompanied by rupture of the molecule, oxygen- or nitrogen-containing by-products may also be present.

The reaction product may be treated in any convenient manner to recover therefrom the desired fluorination product. One convenient way in the case of vapor phase fluorination consists in cooling and condensing the effluent vapors and treating the condensed liquid to separate therefrom the organic fluorine-containing product. Fluorinated organic compounds are substantially insoluble in anhydrous hydrogen fluoride and, when a mixture of the vapors of such compounds and hydrogen fluoride are condensed, two liquid layers are usually apparent, one of which consists principally of anhydrous hydrogen fluoride and the other of which consists principally of fluorinated organic compounds. These layers may be separated and anhydrous hydrogen fluoride thus recovered as a valuable by-product. The layer of fluorinated organic compounds or, in case two layers are not apparent in the condensed product, the entire liquid reaction product may be treated in any one of a number of ways. For example, the liquid may be fractionally distilled and the desired fraction collected, or it may be treated directly with water and subsequently with a dilute aqueous alkali to free it from elemental halogen and acidic substances and then fractionally distilled. In any event the desired fluorine-containing fraction may be collected and less highly fluorinated fractions may, if desired, be recycled to the fluorination reaction vessel to increase the proportion of fluorine in the fraction.

In the case of fluorination with the fused-ring organic reactant in the liquid state, the reaction mixture may be filtered or otherwise treated to separate the organic and inorganic constituents. The inorganic constituents, consisting mainly of spent cobalt trifluoride, may be dried, or washed with a low boiling organic liquid and dried, and then regenerated with elemental fluorine and recycled in the process. The organic constituents may be washed with water and with dilute aqueous alkali to free them from elemental halogen and acidic substances, and the mixture then fractionally distilled. Inert liquid diluents and insufficiently fluorinated organic substances collected during the distillation may be returned either together or separately to the fluorination vessel and the fluorine content of the insufficiently fluorinated portion increased by further treatment with regenerated cobalt trifluoride. Other ways of recovering the desired fluorination product from the reaction mixture will be apparent to those familiar with the art and the present invention is not limited as to such methods of recovery.

Certain advantages of the invention are apparent from the following examples, which are included by way of illustration only and are not to be construed as limiting.

*Example 1*

Approximately 5 mols of anhydrous cobalt dichloride was spread in a thin layer on the bottom of a flat, box-shaped metal reactor equipped for temperature control. The temperature of the reactor and contents was maintained at about 250° C. and anhydrous hydrogen fluoride passed through the reactor for several hours. Elemental fluorine was then passed through the reactor at about the same temperature for several hours. At the end of this period the cobalt in the reactor was found to consist essentially of cobalt trifluoride. The cobalt trifluoride thus prepared was used in subsequent fluorination reaction.

*Example 2*

A reactor containing cobalt trifluoride similar to that described in Example 1 was heated at 200° to 225° C. and 58 grams of a partially fluorinated naphthalene boiling at 135° to 145° C. and having a refractive index at 32° C. of 1.3110 was vaporized in a stream of nitrogen and passed through the reactor over a period of six hours. Organic constituents of the effluent vapors from the reactor were condensed in a cooled receiver. The condensate was washed with water and distilled. The distillate boiled at 130° to 138° C. and had a refractive index at 26° C. of 1.3092. The fluorine content of the distillate was 68.2 per cent.

The distillate was recirculated through the fluorination reactor containing cobalt trifluoride at a temperature of 300° C. A substantial fraction of perfluoronaphthalane was isolated from the reaction product.

*Example 3*

A reactor containing cobalt trifluoride similar to that described in Example 1 was heated at about 280° C. and 17.8 grams of acenaphthene was vaporized and passed through the reactor in a current of nitrogen. Effluent organic vapors from the reactor were condensed in a cooled receiver and the colorless liquid condensate was washed with dilute alkali and water, and then dried. Distillation of the liquid product yielded two fractions. The first fraction weighed 3 grams, boiled at 150° to 170° C. and had an index of refraction at 27° C. of 1.3190. The fraction contained 67.9 per cent fluorine. The second fraction weighed 21 grams, boiled at 170° to 174° C., had an index of refraction at 28° C. of 1.3281 and contained 62.4 per cent fluorine.

*Example 4*

Ten grams of naphthalene was fluorinated with cobalt trifluoride, at a temperature of 220° to 225° C. in a manner similar to that described in Example 3. Six grams of fluorinated naphthalene was obtained boiling at 135° to 145° C. and having a refractive index at 32° C. of 1.3110. Recirculation of this product through the fluorination reactor yielded a product containing 68.7 per cent fluorine.

We claim:
1. A method for the perfluorination of a fused-ring hydrocarbon which includes the step of reacting a fused-ring hydrocarbon with cobalt trifluoride, as the sole fluorinating agent, at a fluorinating temperature between about −30 and 500 degrees centigrade, and separating from the reaction product a perfluoro fused-ring compound containing the same number of carbon atoms as the starting fused-ring hydrocarbon.
2. The method of claim 1, wherein the reaction temperature is maintained between about 20 and 400 degrees centigrade.
3. The process of claim 1, wherein the starting fused-ring hydrocarbon is an unsaturated hydrocarbon.
4. The process of claim 1, wherein the starting fused-ring hydrocarbon is acenaphthene.
5. The process of claim 1, wherein the starting fused-ring hydrocarbon is naphthalene.
6. The process of claim 1, wherein the starting fused-ring hydrocarbon is phenanthrene.

EARL T. McBEE.
RICHARD M. ROBB.

REFERENCES CITED

The following references are of record in the file of this patent:

UNITED STATES PATENTS

| Number | Name | Date |
| --- | --- | --- |
| 2,013,035 | Daudt et al. | Sept. 3, 1935 |
| 2,024,008 | Midgley et al. | Dec. 10, 1935 |
| 2,062,743 | Daudt et al. | Dec. 1, 1936 |
| 2,220,713 | Grosse et al. | Nov. 5, 1940 |
| 2,238,242 | Balon et al. | Apr. 15, 1941 |
| 2,423,045 | Passino et al. | June 24, 1947 |

FOREIGN PATENTS

| Number | Country | Date |
| --- | --- | --- |
| 214,293 | Great Britain | Apr. 14, 1924 |
| 3141/31 | Australia | Jan. 26, 1933 |
| 429,591 | Great Britain | May 28, 1935 |
| 786,123 | France | June 3, 1935 |

OTHER REFERENCES

Ruff and Keim, "Z. fur allg. Chem.," vol. 201, pages 245 to 258 (1931).

Henne et al., "J. A. C. S.," vol. 63, pages 3478–3479 (1941).

Ruff, "Z. angew. Chem.," vol. 41, page 739 (1928).

Moissan, "Comptes rendus," vol. 130, pages 622–627 (1900).

Ruff and Giese, "Zeitschr. anorg. allgem. chem.," vol. 219, pages 143–148 (1934).